United States Patent
Moggio et al.

(10) Patent No.: US 11,483,453 B2
(45) Date of Patent: Oct. 25, 2022

(54) REMOTE SUPPORT SYSTEM AND METHOD

(71) Applicant: Telecom Italia S.p.A., Milan (IT)

(72) Inventors: Fabrizio Moggio, Turin (IT); Nicola Reale, Turin (IT); Andrea Varesio, Turin (IT); Marco Vecchietti, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 16/955,464

(22) PCT Filed: Dec. 20, 2018

(86) PCT No.: PCT/EP2018/086236
§ 371 (c)(1),
(2) Date: Jun. 18, 2020

(87) PCT Pub. No.: WO2019/122152
PCT Pub. Date: Jun. 27, 2019

(65) Prior Publication Data
US 2020/0374421 A1  Nov. 26, 2020

(30) Foreign Application Priority Data

Dec. 21, 2017 (IT) .......................... 102017000148377

(51) Int. Cl.
*H04N 5/04* (2006.01)
*G06T 11/00* (2006.01)
(Continued)

(52) U.S. Cl.
CPC .............. *H04N 5/04* (2013.01); *G06T 11/00* (2013.01); *G11B 27/036* (2013.01); *G11B 27/34* (2013.01);
(Continued)

(58) Field of Classification Search
CPC . H04N 5/04; H04N 5/272; H04N 5/38; G11B 27/036; G11B 27/34; G06T 11/00
See application file for complete search history.

(56) References Cited

U.S. PATENT DOCUMENTS

2008/0280676 A1* 11/2008 Distanik ............. G07F 17/3279
463/29
2012/0301111 A1  11/2012 Cordova
(Continued)

OTHER PUBLICATIONS

DOVE: Drawing over Video Environment by Jiazhi Ou, Xilin Chen, Susan R. Fussel, Jie Yang, Multimedia '03, Proceedings of the eleventh ACM international conference on Multimedia, pp. 100-101, Berkeley, CA, USA, Nov. 2-8, 2003.
(Continued)

*Primary Examiner* — Mishawn N. Hunter
(74) *Attorney, Agent, or Firm* — Banner & Witcoff, Ltd.

(57) ABSTRACT

A remote support communication system comprises a user terminal unit and an operator terminal unit. Said user terminal unit comprises a camera module configured to shoot video images of an object in order to acquire an ordered sequence of video frames forming a corresponding first video and a video transmission module configured to transmit the video frames to the operator terminal unit. Said operator terminal unit comprises a display and drawing module configured to display the video frames and allow an operator to generate digital graphic components to be superimposed on respective video frames; a graphic transmitter module configured to transmit said graphic components to the user terminal unit. The user terminal unit further comprises a graphic receiver module configured to receive, from the operator terminal unit, the digital graphic components; a display module configured to display a second video based on the video frames and the received digital graphic components; and a synchronization module configured to control the display module to display received digital graphic components superimposed on respective video frames.

17 Claims, 6 Drawing Sheets

(51) Int. Cl.
- *G11B 27/036* (2006.01)
- *G11B 27/34* (2006.01)
- *H04N 5/272* (2006.01)
- *H04N 5/38* (2006.01)
- *H04N 21/43* (2011.01)

(52) U.S. Cl.
CPC .............. *H04N 5/272* (2013.01); *H04N 5/38* (2013.01); *H04N 21/43074* (2020.08)

(56) References Cited

U.S. PATENT DOCUMENTS

| | | | |
|---|---|---|---|
| 2015/0035959 A1 | 2/2015 | Amble et al. | |
| 2015/0297949 A1* | 10/2015 | Aman | G06T 7/246 |
| | | | 348/157 |
| 2016/0269631 A1 | 9/2016 | Jiang et al. | |

OTHER PUBLICATIONS

"WEBDOVE: A web-based collaboration system for physical task" by Weiyi Yang, Jiazhi Ou, Yong Rut, Jie Yang, 2006 IEEE International Conference on Multimedia and Expo, Toronto, Ont., Canada, Jul. 9-12, 2006.

"HandsInAir: A WearableSystem for Remote Collaboration" by Weidong Huang, Leila Alem and Jalal Albasri, CSCW 13 Proceedings of the 2013 conference on Computer supported cooperative work companion, pp. 153-156.

"Supporting Hand Gestures in Mobile Remote Collaboration: A usability Evaluation" by by Weidong Huang, Leila Alem, BSC: Conference on Human-Computer Interaction, 2011.

Apr. 3, 2019—(WO) International Search Report and Written Opinion—App PCT/EP2018/086236.

* cited by examiner

REMOTE SUPPORT SYSTEM AND METHOD

BACKGROUND OF THE INVENTION

Field of the Invention

The present invention relates to the field of telecommunications, particularly to the field of remote support communication, and more particularly to the field of remote support communication exploiting both audio and video communication.

Overview of the Related Art

The present invention relates to a system, a method and terminal units which can be applied to a remote support communication scenario in which a communication is established between two (or more) persons (hereinafter, "actors") comprising at least a user who wants to obtain information about a physical object or apparatus (e.g., instructions about the way of using or operating such object) and a support operator knowing the required information.

When the actors are located in the same physical space, they can improve their simple voice-based communication by exploiting the possibility of seeing and directly interacting with said physical object.

When instead such actors are not located in the same physical space, they have to communicate remotely by exploiting telecommunication means. In order to avail of the advantages given by the possibility of seeing the physical object while communicating, the remote communication should be an audiovisual communication, exploiting both an audio channel and a video channel.

However, traditional audiovisual communications may not be sufficient to guarantee the same experience of a face-to-face communication. Indeed, while a traditional audiovisual communication allows the actors to see one to another, this kind of telecommunication means has the strong drawback of preventing the concurrent displaying of the physical object to both the actors, which prevents any kind of interaction with that object during the communication.

Collaboration systems among more actors, based on sharing of documents or virtual whiteboards, are quite widespread, while solutions specifically designed to be applied in collaboration scenarios regarding a physical object or apparatus are far less common.

Among the possible solutions to improve the experience of remote communications regarding a physical object, it is known to allow both the actors to be presented with a video of the physical object, and to allow the support operator to superimpose on the video graphical elements such as circles, arrows, free-hand drawings and so on. By displaying an enriched version of the video of the object provided with graphical elements superimposed by the support operator, the user may avail himself/herself of an improved experience, and can obtain information about the physical object in a quite optimized way.

In this way, during the remote communication, the support operator is provided with the capability to point at specific portions of the physical object by drawing graphical elements, and the user is provided with the possibility of seeing the portions of the physical object indicated by the support operator by simply watching the video of the object with such graphical elements superimposed thereon.

A very important issue of this kind of remote communication relates the synchronization between the video displayed by the user and the graphical elements that have to be superimposed thereon. The graphical elements are indeed generated at the support operator side at the time instant in which the support operator receives the video depicting the object. The operations required to be carried out by the support operator for generating the video with the graphical elements superimposed thereon and the transmission of the latter from the support operator to the user require a non-negligible amount of time. The enriched video with the graphical elements superimposed thereon received by the user is thus delayed with respect to when the video is acquired by the user, and therefore also the graphical elements exhibits the same delay with respect to the acquisition time.

Experimental tests show that the delay between the visualization of the object and the graphical elements is such to cause disturbances such to hinder the communication. In some application field, such as for example the telemedicine field, in which it is of the utmost importance that the graphical elements have to be strongly synchronized with the video, such delay should be reduced at much as possible.

Paper "*DOVE: Drawing over Video Environment*" by Jiazhi Ou, Xilin Chen, Susan R. Fussel, Jie Yang, MULTIMEDIA '03, Proceedings of the eleventh ACM international conference on Multimedia, Pages 100-101, Berkeley, Calif., USA, Nov. 2-8, 2003, discloses to enrich images by graphical elements. The time alignment is obtained using a remote communication based on IP cameras. The object is shot by a camera and the corresponding video, in form of individual images, is transmitted to the actors involved in the collaborative activity.

Paper "*WEBDOVE: A web-based collaboration system for physical task*" by Weiyi Yang, Jiazhi Ou, Yong Rut, Jie Yang, 2006 IEEE International Conference on Multimedia and Expo, Toronto, Ont., Canada, 9-12 Jul. 2006, discloses the WEBDOVE platform that is web based, and has the purpose to extend the collaboration activity to more actors. All the actors may contribute as support operators, enriching the received video. Each actor receives and sends videos that can be enriched with graphical elements by himself/herself. Each video acquired by an actor is sent to all the other actors through a real time video communication. In order to communicate the graphical elements, a moderator server is provided, which is configured to propagate the graphical elements to all the actors.

A different approach is described in "*HandsInAir: A WearableSystem for Remote Collaboration*" by Weidong Huang, Leila Alem and Jalal Albasri, CSCW '13 Proceedings of the 2013 conference on Computer supported cooperative work companion, Pages 153-156. Purpose of this paper is to allow to operate in mobility. A camera and display system is installed on a helmet worn by the actors. A user requiring help sends the video shot by his/her camera to the support operator. The support operator display the received video on a semi-transparent display. The camera of the support operator shoots images of the hands of the support operator, which are separated from the background. The image in the display is composed by the received video plus the hands. In this way, the support operator may indicate the operation to be executed on the real object. The user receives on his/her display the same video composition, obtaining in this way the required support.

Paper "*Supporting Hand Gestures in Mobile Remote Collaboration: A usability Evaluation*" by Weidong Huang, Leila Alem, BSC: Conference on Human-Computer Interaction, 2011, describes a usability study on the VideoInAir system, which substantially coincides with the previous one.

SUMMARY OF THE INVENTION

The Applicant has found that none of the known solutions cited above allows efficient management of the synchronization between the video displayed by the user and the graphical elements that have to be superimposed thereon.

In the paper "*DOVE: Drawing over Video Environment*", both the actors would receive the video with a same delay only if an ideal communication network was used. In real conditions, the communication channel will introduce misalignments between the video received by the two actors. The user who is requesting help is affected by a delay in displaying the object as if the object was physically located in a different place.

The paper "*WEBDOVE: A web-based collaboration system for physical task*" does not provide any description about the way the alignment between graphical elements and video is obtained. Moreover, since the solution described in such paper provides for using a moderator, a disadvantageous increasing in the graphical elements transmission times is foreseen.

The solution disclosed in "*HandsInAir: A WearableSystem for Remote Collaboration*" implies that the received video exhibits a delay with respect to what is displayed in the real world. The video has to be acquired by the user requesting help, then has to be transmitted, composed, recoded by the support operator, and then retransmitted again to the user requesting help. When the delay is higher than a few seconds, the indications of the support operator are no more correlated to what is shot by the user who is requesting help, hindering the quality of the communication.

The paper "*Supporting Hand Gestures in Mobile Remote Collaboration: A usability Evaluation*" underlines that the drawbacks of these kind of solutions are mainly caused by the transmission delays of the videos.

In view of the above, the Applicant has devised a solution for allowing an improved remote support communication between a user and a support operator in which the video displayed by the user is correctly synchronized with the graphical element drawn by the support operator.

An aspect of the present invention relates to a user terminal unit.

According to an embodiment of the present invention, said user terminal unit comprises a camera module configured to shoot video images of an object in order to acquire an ordered sequence of video frames forming a corresponding first video of the object.

According to an embodiment of the present invention, said user terminal unit further comprises a video transmission module configured to transmit the video frames to an operator terminal unit.

According to an embodiment of the present invention, said user terminal further comprises a graphic receiver module configured to receive from the operator terminal unit digital graphic components.

According to an embodiment of the present invention, said user terminal further comprises a display module configured to display a second video based on the video frames and based on the received digital graphic components.

According to an embodiment of the present invention, said user terminal further comprises a synchronization module configured to control the display module in such a way to display received digital graphic components superimposed on respective video frames.

According to an embodiment of the present invention, the user terminal unit is configured to associate to each video frame a corresponding frame timestamp, which specifies the time instant at which the corresponding video frame has been acquired by the camera module.

According to an embodiment of the present invention, each digital graphic component is associated to a respective graphic timestamp corresponding in turn to a respective frame timestamp.

According to an embodiment of the present invention, the synchronization module is configured to control the display module according to a synchronization procedure, which provides to display received digital graphic components superimposed on respective video frames based on said frame timestamp and based on said graphic timestamp.

According to an embodiment of the present invention, the synchronization module is configured to control the display module in such a way that, during a first phase of the synchronization procedure, the displayed second video comprises the video frames of the first video as directly acquired by the camera module, said first phase corresponding to a condition in which the user terminal unit is not receiving digital graphic components from the operator terminal unit.

According to an embodiment of the present invention, the synchronization module is configured to control the display module in such a way that, during a second phase of the synchronization procedure following the first phase, the displayed second video comprises the repetition of the last video frame which was displayed in the first phase, said second phase corresponding to a condition in which the user terminal unit is receiving digital graphic components whose associated graphic timestamps are equal to frame timestamps of previously displayed video frames which have been replaced by subsequent video frames.

According to an embodiment of the present invention, the synchronization module is configured to control the display module in such a way that, during a third phase of the synchronization procedure following the second phase, the displayed second video comprises video frames each one having superimposed thereon a respective graphic component whose graphic timestamp is equal to the frame timestamp of said each video frame.

According to an embodiment of the present invention, the synchronization procedure is a cyclic procedure comprising the reiteration of procedure cycles, each procedure cycle corresponding to a selected one among said first phase, said second phase and said third phase.

According to an embodiment of the present invention, the camera module is configured to acquire video frames with a corresponding acquisition frequency.

According to an embodiment of the present invention, the synchronization module is configured to trigger the reiteration of a new procedure cycle every time a first time period corresponding to the inverse of said acquisition frequency expires.

According to an embodiment of the present invention, the synchronization module is configured to anticipate, with respect to said first time period, the triggering of a reiteration of a new procedure cycle based on measured first time intervals, each one of said measured first time intervals being the time interval measured between the transmissions of a graphic component by the operator terminal unit and the reception of said graphic component by the user terminal unit.

According to an embodiment of the present invention, the synchronization module is configured to measure a second time interval between the reception by the user terminal unit of two subsequent graphic components.

According to an embodiment of the present invention, the synchronization module is configured to calculate a difference between said second time interval and the first time period.

According to an embodiment of the present invention, the synchronization module is configured to force the triggering of a reiteration of a new procedure cycle if the absolute value of said difference is higher than a threshold.

According to an embodiment of the present invention, said threshold is equal to half the first time period.

Another aspect of the present invention relates to an operator terminal unit.

According to an embodiment of the present invention, the operator terminal unit comprises a video receiver module adapted to receive video frames sent by a user terminal.

According to an embodiment of the present invention, the operator terminal unit comprises a display and drawing module configured to display the received video frames and allow an operator of the operator terminal to generate digital graphic components to be superimposed on respective video frames.

According to an embodiment of the present invention, the operator terminal unit comprises a graphic transmitter module configured to transmit said graphic components to the user terminal.

According to an embodiment of the present invention, each video frame has associated thereto a corresponding frame timestamp.

According to an embodiment of the present invention, the operator terminal unit is further configured to associate to each digital graphical component a respective graphic timestamp corresponding to the frame timestamp of the video frame, which was displayed on the display, and drawing module when said graphic component was generated.

Another aspect of the present invention relates to a remote support communication system comprising a user terminal unit and an operator terminal unit.

According to an embodiment of the present invention, said user terminal unit comprises a camera module configured to shoot video images of an object in order to acquire an ordered sequence of video frames forming a corresponding first video of the object.

According to an embodiment of the present invention, said user terminal unit further comprises a video transmission module configured to transmit the video frames to the operator terminal unit.

According to an embodiment of the present invention, said operator terminal unit comprises a display and drawing module configured to display the video frames and allow an operator of the operator terminal unit to generate digital graphic components to be superimposed on respective video frames.

According to an embodiment of the present invention, said operator terminal unit further comprises a graphic transmitter module configured to transmit said graphic components to the user terminal unit.

According to an embodiment of the present invention, the user terminal unit further comprises a graphic receiver module configured to receive from the operator terminal unit the digital graphic components.

According to an embodiment of the present invention, the user terminal unit further comprises a display module configured to display a second video based on the video frames and based on the received digital graphic components.

According to an embodiment of the present invention, the user terminal unit further comprises a synchronization module configured to control the display module in such a way to display received digital graphic components superimposed on respective video frames.

According to an embodiment of the present invention, the user terminal unit is configured to associate to each video frame a corresponding frame timestamp, which specifies the time instant at which the corresponding video frame has been acquired by the camera module.

According to an embodiment of the present invention, the operator terminal unit is configured to associate to each digital graphic component a respective graphic timestamp corresponding to the frame timestamp of the video frame, which was displayed on the display, and drawing module when said graphic component was generated.

According to an embodiment of the present invention, the synchronization module is configured to control the display module according to a synchronization procedure, which provides to display received digital graphic components superimposed on respective video frames based on said frame timestamp and based on said graphic timestamp.

Another aspect of the present invention relates to a method.

According to an embodiment of the present invention, the method comprises, at a user terminal unit, shooting video images of an object in order to acquire an ordered sequence of video frames forming a corresponding first video of the object, and transmitting the video frames to a second terminal unit.

According to an embodiment of the present invention, the method comprises, at an operator terminal unit, displaying the video frames and allowing an operator of the operator terminal unit to generate digital graphic components to be superimposed on respective video frames, and transmitting said graphic components to the user terminal unit.

According to an embodiment of the present invention, the method further comprises, at the user terminal unit, receiving from the operator terminal unit the digital graphic components; displaying a second video based on the video frames and based on the received digital graphic components; controlling the display module in such a way to display received digital graphic components superimposed on respective video frames.

According to an embodiment of the present invention, the method further comprises, at the user terminal unit, associating to each video frame a corresponding frame timestamp, which specifies the time instant at which the corresponding video frame has been acquired by the camera module.

According to an embodiment of the present invention, the method comprises, at the operator terminal unit, associating to each digital graphic component a respective graphic timestamp corresponding to the frame timestamp of the video frame, which was displayed on the display, and drawing module when said graphic component was generated.

According to an embodiment of the present invention, the method further comprises, at the user terminal unit, displaying received digital graphic components superimposed on respective video frames based on said frame timestamp and based on said graphic timestamp.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION

Figure 1:
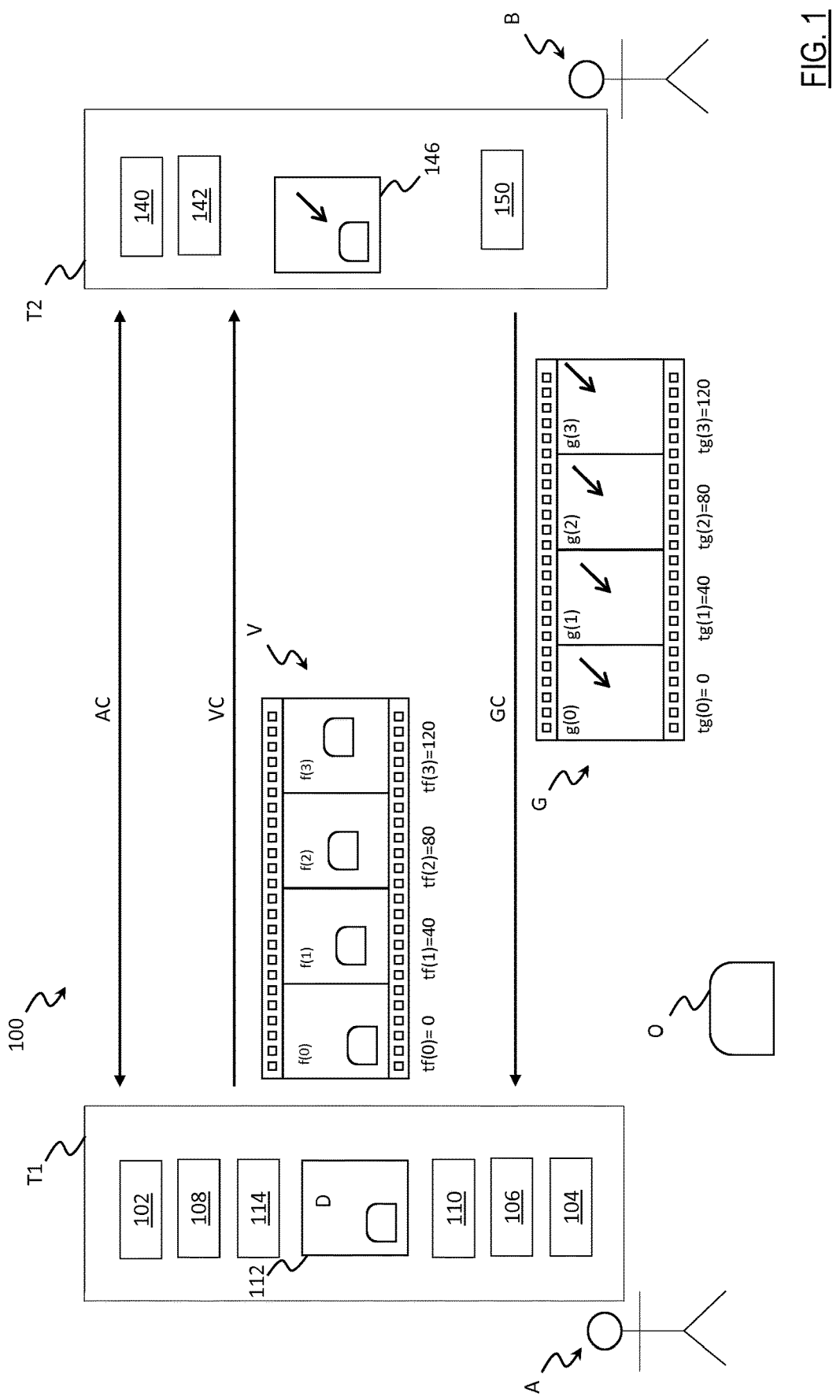
FIG. 1 illustrates in terms of functional blocks a remote support communication system according to an embodiment of the present invention.

FIG. 1 illustrates in terms of functional blocks a remote support communication system 100 according to an embodiment of the present invention. The remote support communication system 100 is configured to provide remote audio and video communication between two or more actors comprising a user A requiring to obtain information about a physical object or apparatus O and a support operator (or simply "operator") B having such required information. The user A and the operator B are remote from each other, being located in different locations, such as in different buildings, while the object O is located in the same location of the user A, or at least very close to the latter.

The remote support communication system 100 according to an embodiment of the present invention comprises a user terminal unit—referred to as first terminal unit T1—adapted to be operated by the user A, and an operator terminal unit—referred to as second terminal unit T2—adapted to be operated by the operator B.

According to an embodiment of the present invention, the first terminal unit T1 comprises an audio communication module 102 adapted to transmit and receive audio signals to/from the second terminal unit T2 over a bidirectional (from T1 to T2 and vice versa) audio communication channel AC. The audio communication module 102 further comprises an audio signal generation unit (not illustrated) configured to generate an audio signal from a speech uttered by the user A and captured by a microphone (not illustrated), and an audio speaker system (not illustrated).

According to an embodiment of the present invention, the first terminal unit T1 further comprises a camera module 104 adapted to shoot video images of the object O. A video processing module 106 is provided, which is configured to process, (e.g., performing coding, compressing and buffering operations) the output of the camera module 104 to generate a corresponding video V depicting the object O. The first terminal unit T1 further comprises a video transmission module 108 adapted to transmit the video V to the second terminal unit T2 over a unidirectional (from T1 to T2) video communication channel VC, such as a 3G, a 4G, a WiFi, an ADSL, a lan communication channel.

The video V is transmitted with compression techniques such to guarantee a low transmission bandwidth occupation, and at the same time a video quality sufficient to allow an efficient interaction with the shot object O. For example, the H.264 video compression standard may be advantageously exploited. Moreover, the video is encoded with a coding technique, which is adapted in real time based on the bandwidth available on the video communication channel VC, in such a way to reduce the video reception delay as much as possible.

According to an embodiment of the present invention, the first terminal unit T1 comprises a graphic receiver module 110 configured to receive data about digital graphic elements G—such as arrows, circles, lines—sent by the second terminal unit T2 over a unidirectional (from T2 to T1) communication channel GC.

According to an embodiment of the present invention, the first terminal unit T1 further comprises a display module 112 adapted to display the object's O images shot by the camera module 104. As will be described in detail in the following of the present description, the display module 112 is designed to display a video D which may be either the video V as directly generated by video processing module 106 or a processed version of such video with digital graphic elements G superimposed thereon based on the data received from the second terminal unit T2 over the communication channel CG.

According to an embodiment of the present invention, the first terminal unit T1 further comprises a synchronization module 114 configured to carry out a synchronization procedure directed to control the generation and the display of the video D on the display module 112, as will be described in detail in the following of the description.

According to an embodiment of the present invention, the second terminal unit T2 comprises a further audio communication module 140 adapted to transmit and receive audio signals to/from the first terminal unit T1 over the audio communication channel AC. The further audio communication module 140 further comprises an audio signal generation unit (not illustrated) configured to generate an audio signal from a speech uttered by the operator B and captured by a microphone (not illustrated), and an audio speaker system (not illustrated).

The second terminal unit T2 further comprises a video receiver module 142 adapted to receive the video V transmitted by the first terminal unit T1 over the video communication channel VC.

According to an embodiment of the present invention, the second terminal unit T2 further comprises a display and drawing module 146 configured to display the received video V and provide a drawing area thereon adapted to allow the operator B to generate digital graphic elements G to be superimposed on the video V. For example, the display and drawing module 146 may be a video touch screen. While drawing such digital graphic elements G, the operator B is provided with the possibility of viewing the results of his/her operations through the display and drawing module 146, which is configured to display the video V with the drawn digital graphic elements G superimposed thereon.

According to an embodiment of the present invention, the second terminal unit T2 comprises a graphic transmitter module 150 configured to send data about the digital graphic elements G to the first terminal unit T1 over the communication channel GC.

According to an embodiment of the present invention, the data about the digital graphic elements G are normalized, in such a way that the graphical depiction is invariant with respect to the scale factor and aspect ratio of the drawing area of the display and drawing module 146.

The video V comprises an ordered sequence of video frames (or, simply frames) f(i), i=0, 1, 2, 3, 4, . . . . The first terminal unit T1 associates to each frame f(i) a corresponding timestamp tf(i) which specifies the time instant at which the corresponding frame f(i) has been acquired by the camera module 104. In the example illustrated in FIG. 1, the video V is acquired at an acquisition frequency of =25 Hz, and the values of the timestamps tf(i) are depicted in milliseconds. According to an embodiment of the present invention, each time a new video frame f(i) is acquired by the camera module 104, such video frame f(i) is listed by the synchronization unit 114 in a corresponding list L.

The digital graphic elements G comprise a sequence of graphic components g(j), j=0, 1, 2, 3, 4, . . . . Each graphic component g(j) represents a graphic element (or a portion thereof) as drawn by the operator B by the display and drawing module 146 when he/she was seeing a particular frame f(i) on the display and drawing module 146 itself. The second terminal unit T2 associates to each graphic component g(j) a corresponding timestamp tg(j) which is set to the value of the timestamp tf(i) of the frame f(i) of the video V over which the operator B has drawn such graphic component g(j), i.e., the frame f(i) which was displayed on the display and drawing module 146 when the graphic component g(j) was generated (i.e., drawn). In this way, an association is made between video frames f(i) and graphic components g(j).

In order to allow the user A to understand and follow instructions provided by the operator B about the object O, it is very important that the video D displayed on the display module 112 of the first terminal unit T1 is generated by overlapping the graphic components g(j) on the correct corresponding video frames f(i). According to an embodiment of the present invention, this is guaranteed by the synchronization unit 114.

Compared to solutions know in the art, where all the actors involved in the communication have to transmit a respective video to the other actors, or to a centralized unit, the solution according to an embodiment of the present invention advantageously provides that the only video transmission is carried out from the first terminal unit T1 to the second terminal unit T2. The second terminal unit T2 transmits to the first terminal unit T1 only data about digital graphic elements G, which typically require a far lower amount of data to be transferred compared to a video. In this way, the delays introduced by the transmission are significantly reduced.

The time interval, which begins at the acquisition of a new video frame f(i) by the camera module 104 of the first terminal unit T1 and ends at the reception of this video frame f(i) by the second terminal unit T2, is identified as $\Delta T$. $\Delta T$ takes into account the video coding, compressing and buffering times, plus the actual transmission time from T1 to T2.

The time interval, which begins at the transmission of a graphic component g(j) by the second terminal unit T2 and ends at the reception of the graphic component g(j) by the first terminal unit T1, is identified as $\Delta G$.

Apart from exceptional cases, like serious network malfunctioning, $\Delta T$ and $\Delta G$ are approximately constant for each video frame f(i) and for each graphic component g(j).

Figure 2:
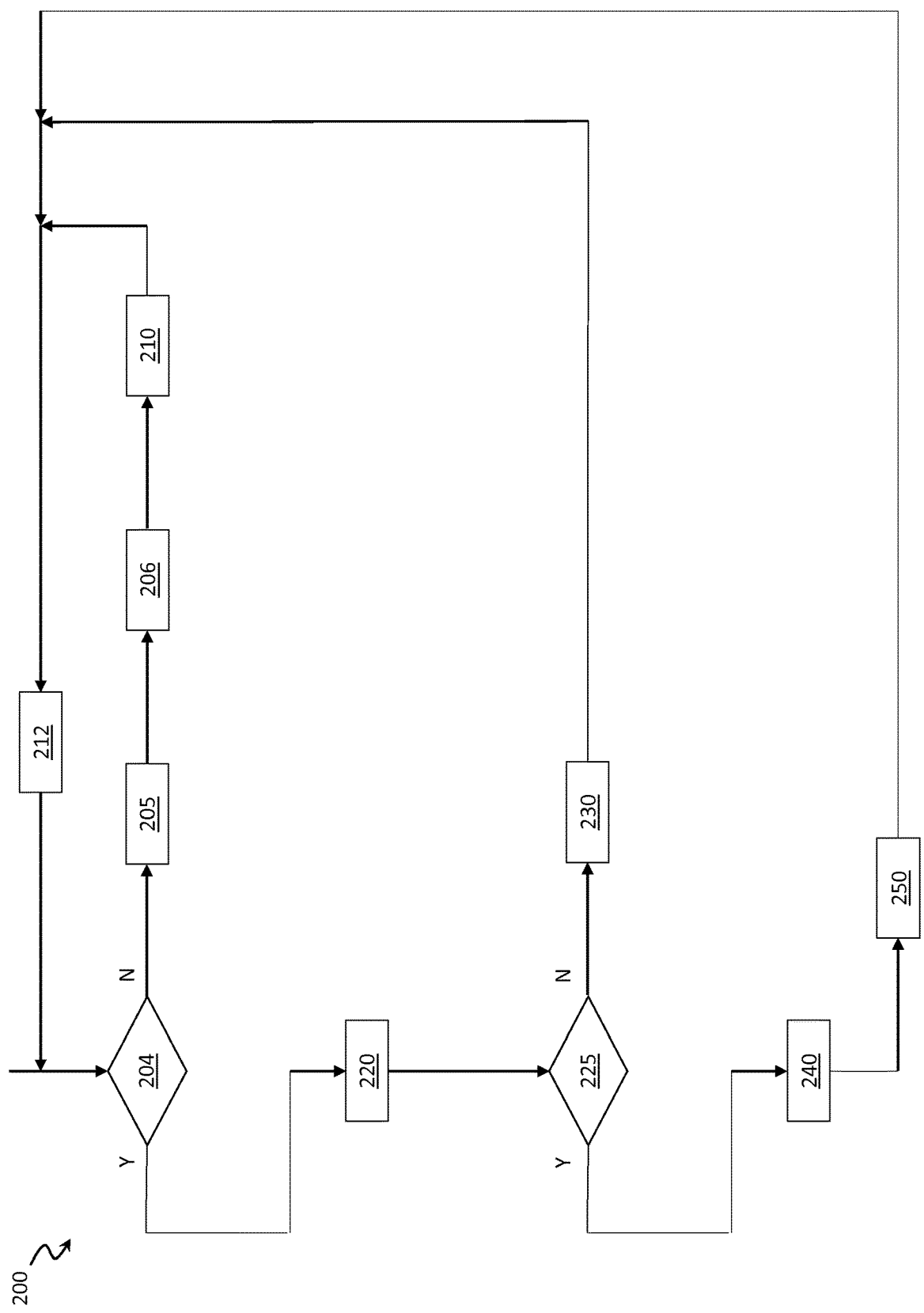
FIG. 2 is a flow chart illustrating the main phases of a synchronization procedure for controlling the generation and the display of a video according to an embodiment of the present invention.

FIG. 2 is a flow chart illustrating the main phases of a synchronization procedure 200 carried out by the synchronization module 114 of the first terminal unit T1 for controlling the generation and the display of the video D on the display module 112 according to an embodiment of the present invention.

The synchronization procedure 200 is a cyclic procedure, in which the beginning of each procedure cycle is in general triggered with a frequency corresponding to the acquisition frequency af of the frames f(i) of the video V. Therefore, each procedure cycle is in general reiterated with a periodicity corresponding to the inverse of the acquisition frequency af. However, as will be described in the following of the present description, in some special conditions, the triggering of a new synchronization procedure 200 cycle may be forced to occur at a different time.

The first operation of the synchronization procedure 200 provides for checking if there is any new graphic component g(j) received from the second terminal unit T2 (block 204).

In the negative case (exit block N of block 204), the synchronization module 114 accesses the list L of the video frames f(i) previously acquired by the camera module 104 and checks their respective timestamps tf(i) for identifying which is the most recent video frame f(i), i.e., the last one that was acquired (block 205). Then, the synchronization module 114 drives the display module 112 to display the identified most recent video frame f(i) (block 206) and removes from the list L possible video frames f(i) which are older than said most recent video frame f(i) (block 210). At this point, the procedure is stayed for a waiting time $\Delta p$ corresponding to the inverse of the video frame acquisition frequency af (block 212), and then a new procedure cycle is triggered (returning to block 204).

If instead a new graphic component g(j) has been received from the second terminal unit T2 (exit block Y of block 204), the synchronization module 114 accesses the list L of the video frames f(i) previously acquired by the camera module 104 and checks whether there is a listed video frame f(i) whose time stamp tf(i) is equal to the timestamp tg(j) of said new graphic component g(j) (block 220).

If the list L does not include the video frame f(i) whose time stamp tf(i) is equal to the timestamp tg(j) of said new graphic component g(j) (exit branch N of block 225), the synchronization module 114 identifies which is the least recent video frame f(i) of the list, and drives the display module 112 to display said identified least recent video frame f(i) (block 230). Said identified least recent video frame f(i) is not removed from the list L. It has to be appreciated that the least recent video frame f(i) included in the list L is the video frame f(i) which has been already displayed on the display module 112 in the previous cycle of the procedure. At this point, the procedure is stayed for the waiting time $\Delta p$ (block 212), and then a new procedure cycle is triggered (returning to block 204).

If instead the list L includes the video frame f(i) whose time stamp tf(i) is equal to the timestamp tg(j) of said new graphic component g(j) (exit branch Y of block 225), the synchronization module 114 drives the display module 112 to display such video frame f(i) with superimposed thereon the graphic component g(j) (block 240). The synchronization module 114 then removes from the list L possible video frames f(i) which are older than said video frame f(i) whose time stamp tf(i) is equal to the timestamp tg(j) (block 250). At this point, the procedure is stayed for the waiting time $\Delta p$ (block 212), and then a new procedure cycle is triggered (returning to block 204).

According to an embodiment of the present invention, in order to compensate for the delay corresponding to the time interval $\Delta G$, the timestamps tg(j) are increased by adding thereto the time at which the corresponding graphic components g(j) have been inserted in the communication channel GC by the second terminal unit T2. When the graphic components g(j) are received by the first terminal unit T1, the difference between the insertion time and the reception time is calculated. The various differences are collected for a time window (for example, having a length of 10 seconds). Every time the time window is expired, the time interval ΔG is calculated as the average value of such differences. The obtained time interval ΔG may be used to anticipate the triggering of a new synchronization procedure 200 cycle.

It has to be appreciated that the synchronization procedure 200 illustrated in FIG. 2 may be subdivided in three different main phases, namely a "preview phase" corresponding to the operations following to the exit branch N of block 204, an "alignment phase" corresponding to the operations following to the exit branch Y of block 204 and the exit branch N of block 225, and a "drawing phase" corresponding to the operations following to the exit branch Y of block 204 and the exit branch Y of block 225.

During the preview phase, no graphic component g(j) has been received yet, and the video D displayed on the display module 112 is formed by the video frames f(i) of the video V as directly acquired by the camera 104.

During the alignment phase, while graphic components g(j) are now available, such graphic components g(j) corresponds to too old video frames f(i) of the video V acquired by the camera 104, which were already displayed on the display module 112 in a previous time, and have been replaced by subsequent video frames f(i). In this phase, the video D displayed on the display module 112 is formed by the repetition of the last video frame f(i) which was already displayed on the display module 112 in the previous preview phase.

During the drawing phase, the available graphic component g(j) is finally temporally aligned to the sequence of video frames f(i) of the video V acquired by the camera module 104. In this phase, the video D displayed on the display module 112 is formed by the video frames f(i) with superimposed thereon the associated (i.e., having the same timestamps) graphic components g(j).

Figure 3:
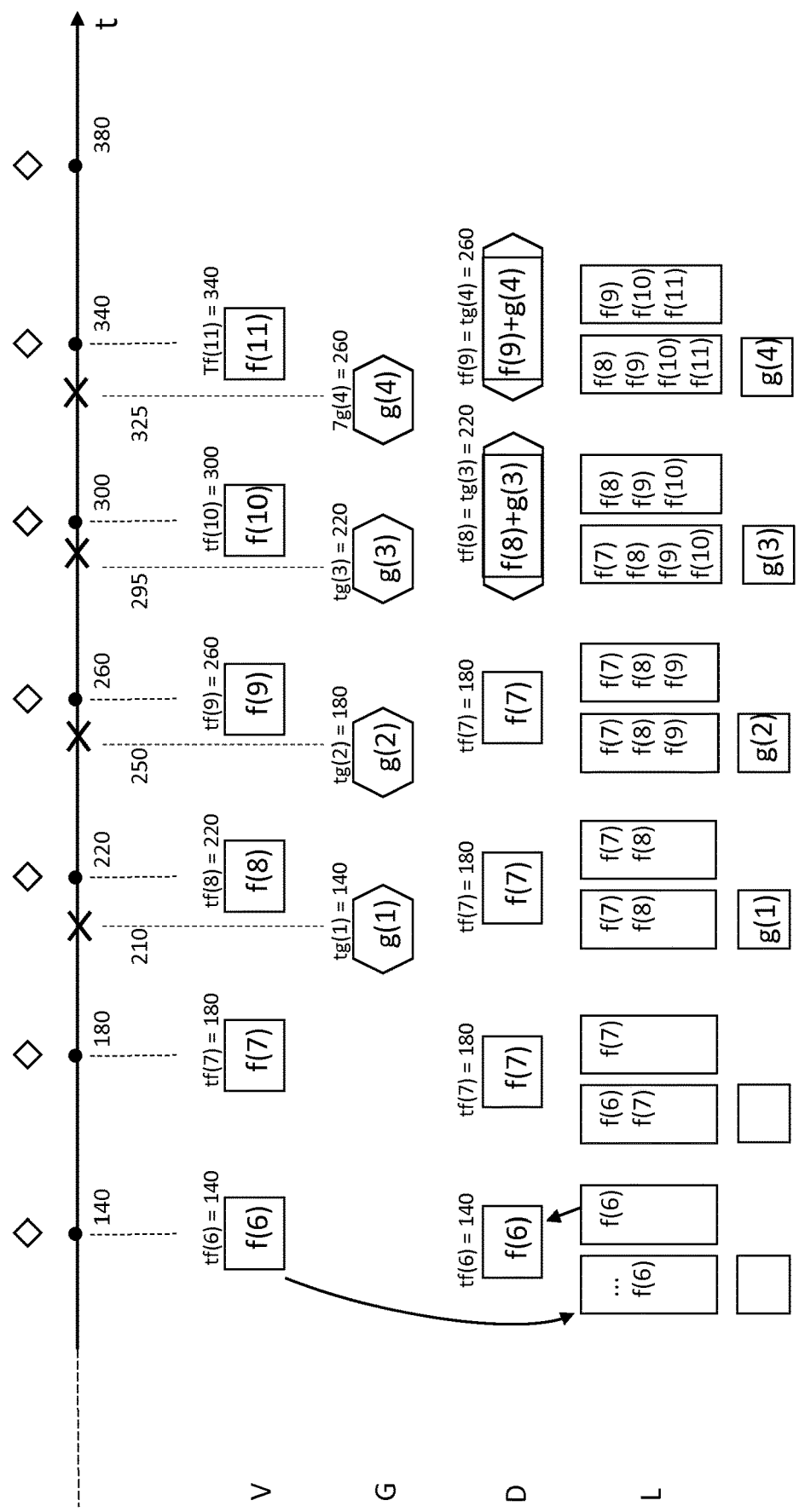
FIG. 3 is a time diagram showing an example of how acquired video, graphic elements, displayed video, and a video frame list evolve during six cycles of the synchronization procedure of FIG. 2.

FIG. 3 is a time diagram showing an example of how the video V acquired by the camera module 104, the graphic elements G, the video D displayed on the display module 112 and the list L evolve during six cycles of the synchronization procedure 200. The "•" symbols correspond to time instants in which video frames f(i) are acquired by the camera module 104; the "x" symbols correspond to time instants in which graphic components g(j) are received by the first terminal unit T1, and the "◇" symbols correspond to time instants in which a new cycle of the synchronization procedure 200 is triggered (causing the execution of a new reiteration of the check corresponding to block 204 of the procedure).

In the considered example, the preview phase lasts until the acquisition of the frame f(7). During the alignment phase, when the graphic components g(1) (associated to the frame f(6)) and g(2) (associated to the frame f(7)) start to arrive at the first terminal unit T1, the video D provides for the repetition of the last frame f(7) displayed in the preview phase. The drawing phase starts at the acquisition of the frame f(10), wherein the video frame f(8) is displayed with superimposed thereon the associated graphic component g(3).

The performance of the remote support communication system 100 may be negatively affected by the drift which can happen between a clock dictating the timing of the operations carried out by the first terminal unit T1 and a clock dictating the timing of the operations carried out by the second terminal unit T2. Such drift adds itself to the transmission times intrinsic to the communication channel CG (i.e., the time interval ΔG). The time interval between the reception of two subsequent graphic components g(j), g(j+1) at the first terminal unit T1 is influenced by the drift of the clock dictating the timing with which the frames f(i) are received and displayed at the second terminal unit T2.

According to an embodiment of the present invention, in order to compensate the negative effects of such drift, the triggering of a new cycle of the synchronization procedure 200 (i.e., the execution of the check corresponding to block 240 of the synchronization procedure) may be forced to occur at a time which is different than the standard one determined by the waiting time zip (see block 212 of FIG. 2).

Figure 4:
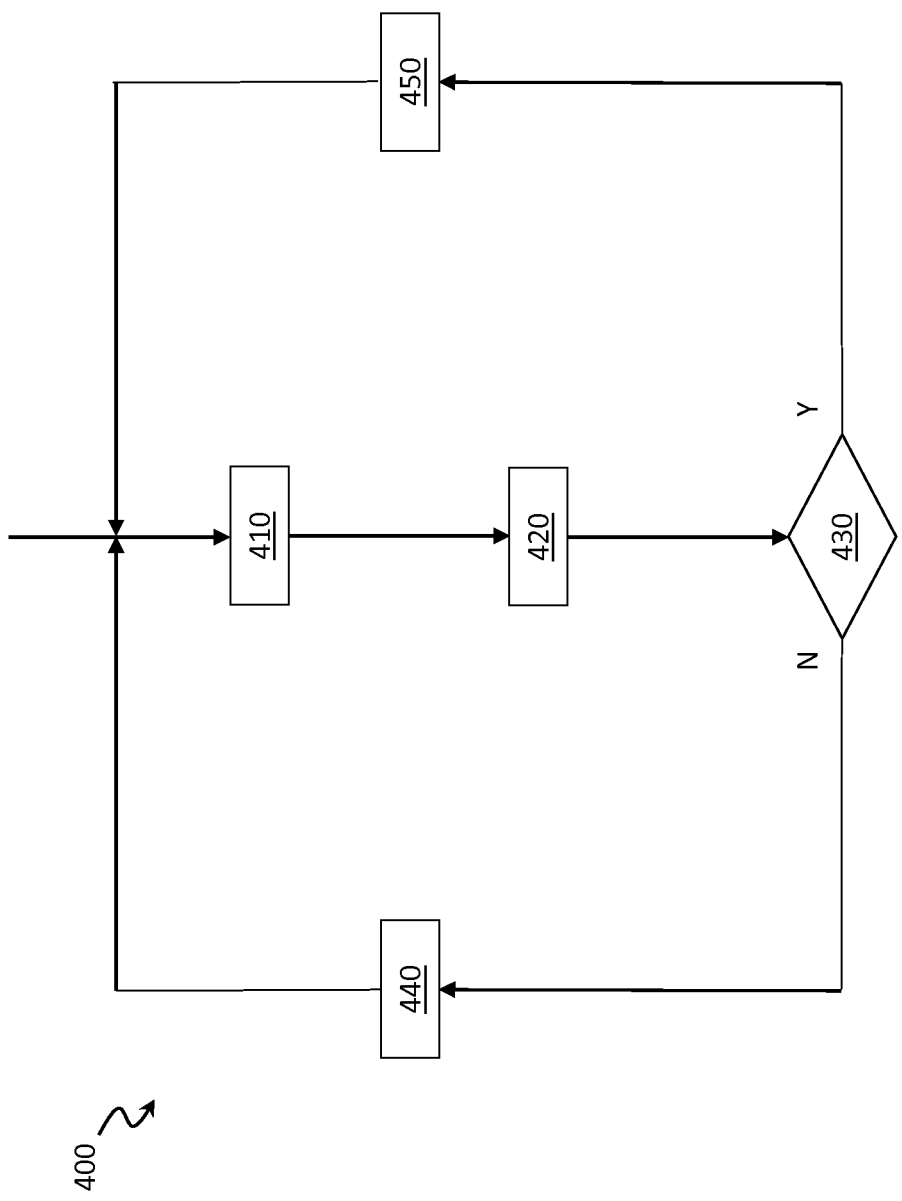
FIG. 4 is a flow chart illustrating the main phases of a forcing procedure for forcing the triggering of a new cycle of the synchronization procedure of FIG. 2 according to an embodiment of the present invention.

FIG. 4 is a flow chart illustrating the main phases of a forcing procedure 400 carried out by the synchronization module 114 of the first terminal unit T1 in parallel to the synchronization procedure 200 for forcing the triggering of a new cycle of the synchronization procedure 200 when the abovementioned drift has caused an excessive time misalignment between the first terminal unit T1 and the second terminal unit T2.

Every time a new graphic component g(i) is received, the synchronization module 114 calculates (block 410) the time interval M occurring between the reception by the first terminal unit T1 of two subsequent graphic components g(j), g(j+1).

It has to be appreciated that because of the time drift between the first and second terminal units T1 and T2, the time interval M may vary in time.

The next operation provides for calculating the difference δ between such time interval M and the waiting time Δp (block 420). As already mentioned with reference to FIG. 2, such waiting time corresponds to the inverse of the frequency af with which the video frames f(i) are acquired by the camera module 104.

If the absolute value of the difference δ is lower than Δp/2 (exit branch N of block 430), the effect of the misalignment in time between the first and second terminal units T1 and T2 is considered not critical. In this case (block 440, and then returning to block 410 when a new graphic component g(i) is received), the forcing procedure 400 does not influence the operation of the synchronization procedure 200, and the new cycle thereof is normally triggered after the waiting time Δp is lapsed (see block 212 of FIG. 2).

If the absolute value of the difference δ is higher than Δp/2 (exit branch Y of block 430), the effect of the misalignment in time between the first and second terminal units T1 and T2 is considered critical. In this case (block 450, and then returning to block 410 when a new graphic component g(i) is received), the synchronization module 114 forces the triggering of a new cycle of the synchronization procedure 200, irrespective of the waiting time Δp. In this way, the first terminal unit T1 and the second terminal unit T2 are aligned again in time.

Δp/2 has been used as a threshold for the difference δ in order to advantageously avoid to cause that the triggering of a new cycle of the synchronization procedure 200 is varied with a too high frequency, avoiding thus to negatively affect the fluidity of the video. However, similar considerations apply in case different threshold values are selected.

Figure 5:
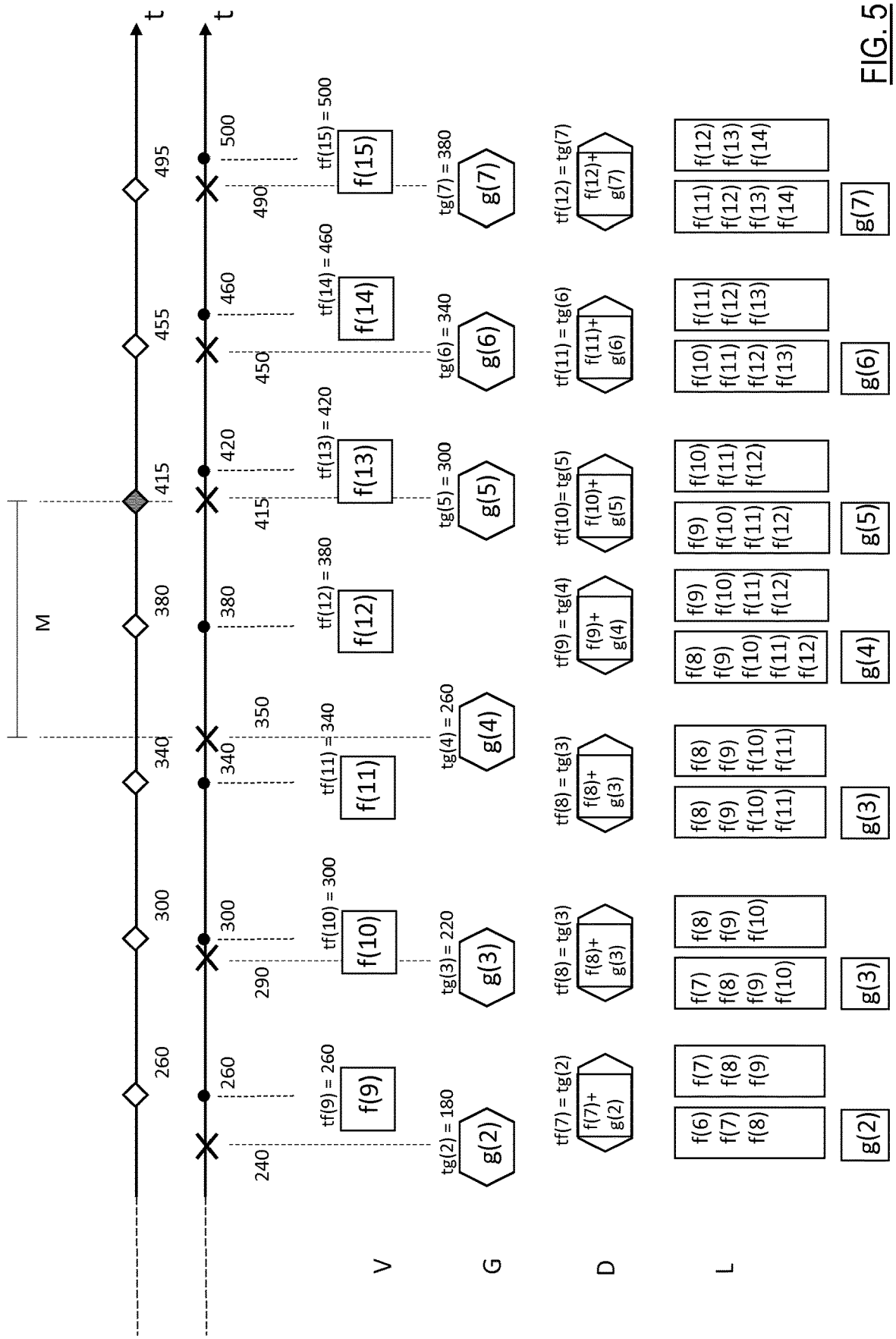
FIG. 5 is a time diagram showing an example of how acquired video, graphic elements, displayed video, and a video frame list evolve during cycles of the synchronization procedure of FIG. 2 under the control of the forcing procedure of FIG. 4.
Figure 6:
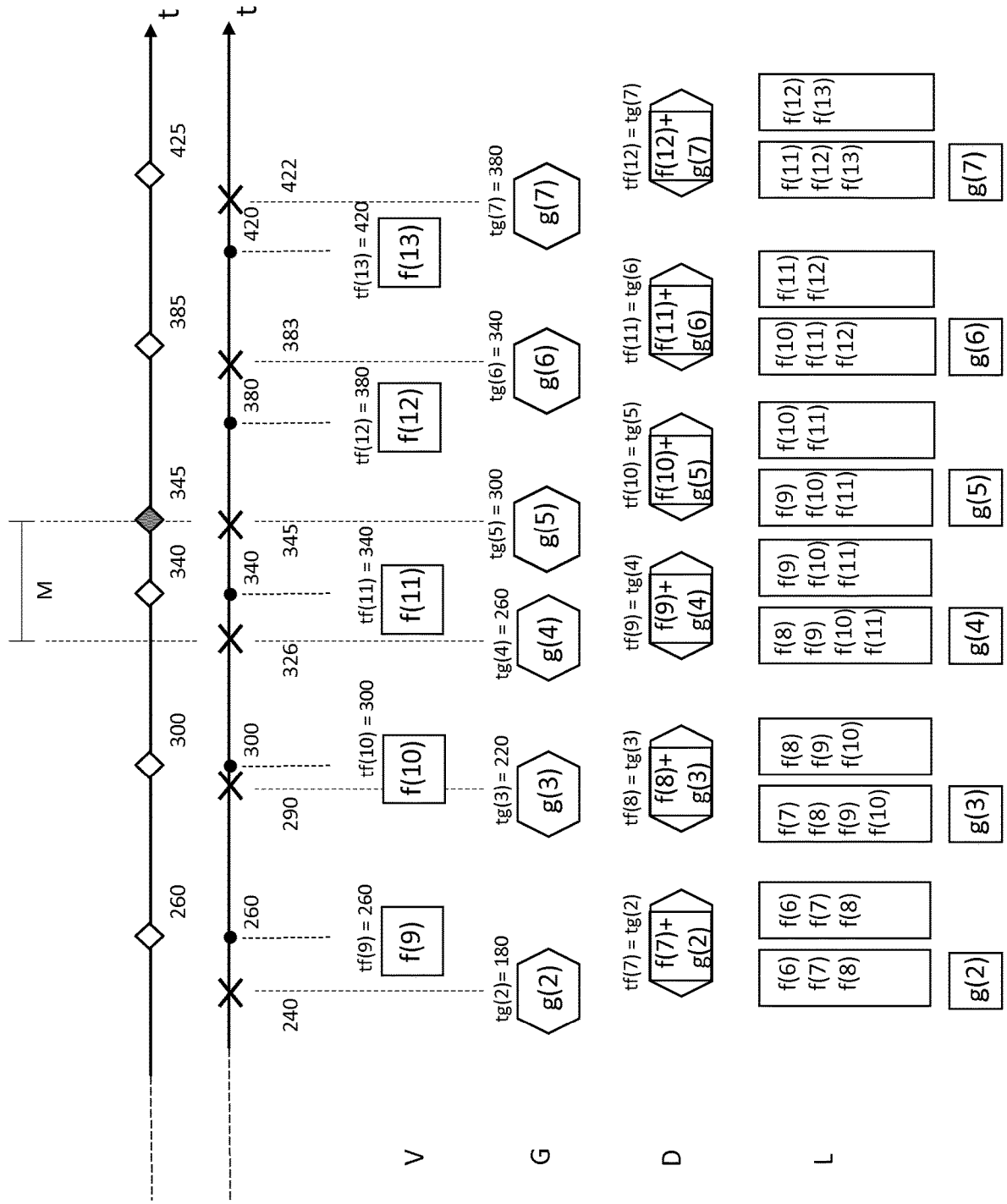
FIG. 6 is a time diagram showing a further example of how acquired video, graphic elements, displayed video, and a video frame list evolve during cycles of the synchronization procedure of FIG. 2 under the control of the forcing procedure of FIG. 4.

FIGS. 5 and 6 are time diagrams showing two examples of how the video V acquired by the camera module 140, the graphic elements G, the video D displayed on the display module 112 and the list L evolve in time in case the triggering of a cycle of the synchronization is forced by the forcing procedure 400. In both examples, the video frame acquisition frequency af is equal to 25 Hz, and thus the waiting time Δp corresponds to 40 milliseconds, and the threshold Δp/2 is equal to 20 milliseconds.

In the example of FIG. 5, the synchronization module 114 forces the triggering of a new cycle of the synchronization procedure 200 at the reception by the first terminal unit T1 of the graphic component g(5), because the time interval M occurring between the reception by the first terminal unit T1 of the graphic component g(4) and the reception by the first terminal unit T1 of the graphic component g(5) is equal to 65 milliseconds, and thus the corresponding absolute value of the difference δ is equal to 25 milliseconds, which is higher than the threshold Δp/2.

In the example of FIG. 6, the synchronization module 114 forces the triggering of a of a new cycle of the synchronization procedure 200 at the reception by the first terminal unit T1 of the graphic component g(5), because the time interval M occurring between the reception by the first terminal unit T1 of the graphic component g(4) and the reception by the first terminal unit T1 of the graphic component g(5) is equal to 19 milliseconds, and thus the corresponding absolute value of the difference δ is equal to 21 milliseconds, which is higher than the threshold Δp/2.

It should be noted that the terms 'unit', 'system' or 'module' are herein intended to comprise, but not limited to, hardware, firmware, a combination of hardware and software, software.

For example, a unit, system or module may be, but is not limited to being, a process running on a processor, a processor, an object, an executable, a thread of execution, a program, and/or a computing device.

In other words, a unit, system or module may comprise an application being executed on a computing device and/or the computing device itself.

One or more units, systems or modules may be localized on one computing device and/or distributed between two or more computing devices.

Units, systems or modules may comprise and/or interact with computer readable media having storing data according to various data structures.

The units, systems or modules may communicate by exploiting local and/or remote processes, preferably by electrical, electromagnetic and/or optical signals providing one or more data packets, such as data packets from one unit, system or module interacting with another unit, system or module in a local system, in a distributed system, and/or across a radio network and/or a wired network.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in other embodiments.

The invention claimed is:

1. A user terminal, comprising:
one or more computing devices;
non-transitory computer readable storage media having stored thereon a plurality of modules, which when executed by the one or more computing devices, cause the user terminal to:
shoot, using a camera module, video images of an object in order to acquire, with an acquisition frequency, an ordered sequence of video frames forming a corresponding first video of the object;
transmit, using a video transmission module, the video frames to an operator terminal;
receive, using a graphic receiver module and from the operator terminal, digital graphic components;
display, using a display module, a second video based on the video frames and based on the received digital graphic components; and
control, using a synchronization module, the display module in such a way to display the received digital graphic components superimposed on respective video frames, wherein controlling the display module comprises:
during a first phase of a synchronization procedure, displaying the second video by displaying the video frames of the first video as acquired by the camera module,
during a second phase of the synchronization procedure, following the first phase of the synchronization procedure, displaying the second video by repeating a last video frame that was displayed in the first phase,
during a third phase of the synchronization procedure, following the second phase of the synchronization procedure, displaying the second video by displaying the received digital graphic components superimposed on the respective video frames, each of the respective video frames having a graphic timestamp equal to a frame timestamp of each video frame, wherein the synchronization procedure comprises a cyclic procedure comprising reiteration of procedure cycles, each procedure cycle corresponding to a selected one among the first phase, the second phase, and the third phase, and
triggering, using the synchronization module, reiteration of a new procedure cycle every time a first time period corresponding to an inverse of the acquisition frequency is expired.

2. The user terminal of claim 1, wherein:
the user terminal is configured to associate to each video frame a corresponding frame timestamp which specifies a time instant at which the corresponding video frame has been acquired by the camera module;
each digital graphic component is associated to a respective graphic timestamp corresponding in turn to a respective frame timestamp; and
the synchronization module is configured to control the display module according to the synchronization procedure which displays the received digital graphic components superimposed on the respective video frames based on the frame timestamp and based on the graphic timestamp.

3. The user terminal of claim 2, wherein the first phase corresponds to a condition in which the user terminal is not receiving digital graphic components from the operator terminal.

4. The user terminal of claim 3, wherein the second phase corresponds to a condition in which the user terminal is receiving digital graphic components including associated graphic timestamps equal to frame timestamps of previously displayed video frames which have been replaced by subsequent video frames.

5. The user terminal of claim 1, wherein the synchronization module is configured to anticipate, with respect to the first time period, the triggering of the reiteration of the new procedure cycle based on measured first time intervals, each one of the measured first time intervals being a time interval measured between transmissions of a digital graphic component by the operator terminal and the reception of the digital graphic component by the user terminal.

6. The user terminal of claim 1, wherein the synchronization module is configured to:
measure a second time interval between the reception, by the user terminal, of two subsequent graphic components;
calculate a difference between the second time interval and the first time period; and
forcing the triggering of the reiteration of the new procedure cycle if an absolute value of the difference is higher than a threshold.

7. The user terminal of claim 6, wherein the threshold is equal to half the first time period.

8. A remote support communication system comprising a user terminal and an operator terminal, wherein:
the user terminal comprises:
one or more first computing devices; and
first non-transitory computer readable storage media having stored thereon a plurality of first modules, that, when executed by the one or more first computing devices, cause the user terminal to:
shoot, using a camera module, video images of an object in order to acquire, with an acquisition frequency, an ordered sequence of video frames forming a corresponding first video of the object; and
transmit, using a video transmission module, the video frames to the operator terminal,
the operator terminal comprises:
one or more second computing devices; and
second non-transitory computer readable storage media having stored thereon a plurality of second modules, that when executed by the one or more second computing devices, cause the operator terminal to:
display, using a display and drawing module, the video frames and allow an operator of the operator terminal to generate digital graphic components to be superimposed on respective video frames;
transmit, using a graphic transmitter module, the digital graphic components to the user terminal;
wherein the first modules, when executed by the one or more first computing devices, further cause the user terminal to:
receive, using a graphic receiver module and from the operator terminal, the digital graphic components;
display, using a display module, a second video based on the video frames and based on the received digital graphic components; and
control, using a synchronization module, the display module in such a way to display the received digital graphic components superimposed on respective video frames, wherein controlling the display module comprises:
during a first phase of a synchronization procedure, displaying the second video by displaying the video frames of the first video as acquired by the camera module,
during a second phase of the synchronization procedure, following the first phase of the synchronization procedure, displaying the second video by repeating a last video frame that was displayed in the first phase,
during a third phase of the synchronization procedure, following the second phase of the synchronization procedure, displaying the second video by displaying the received digital graphic components superimposed on the respective video frames, each of the respective video frames having a graphic timestamp equal to a frame timestamp of each video frame, wherein the synchronization procedure comprises a cyclic procedure comprising reiteration of procedure cycles, each procedure cycle corresponding to a selected one among the first phase, the second phase, and the third phase, and
triggering, using the synchronization module, reiteration of a new procedure cycle every time a first time period corresponding to an inverse of the acquisition frequency is expired.

9. The remote support communication system of claim 8, wherein:
the user terminal is configured to associate to each video frame a corresponding frame timestamp which specifies a time instant at which the corresponding video frame has been acquired by the camera module;
the operator terminal is configured to associate to each digital graphic component a respective graphic timestamp corresponding to the frame timestamp of the video frame which was displayed on the display and drawing module when the digital graphic component was generated; and
the synchronization module is configured to control the display module according to the synchronization procedure which displays the received digital graphic components superimposed on the respective video frames based on the frame timestamp and based on the graphic timestamp.

10. The remote support communication system of claim 8, wherein the synchronization module is configured to anticipate, with respect to the first time period, the triggering of the reiteration of the new procedure cycle based on measured first time intervals, each one of the measured first time intervals being a time interval measured between transmissions of a digital graphic component by the operator terminal and the reception of the digital graphic component by the user terminal.

11. The remote support communication system of claim 8, wherein the synchronization module is configured to:
measure a second time interval between the reception, by the user terminal, of two subsequent graphic components;
calculate a difference between the second time interval and the first time period; and
forcing the triggering of the reiteration of the new procedure cycle if an absolute value of the difference is higher than a threshold.

12. The remote support communication system of claim 11, wherein the threshold is equal to half the first time period.

13. A method, comprising:
  at a user terminal:
    shooting video images of an object in order to acquire, with an acquisition frequency, an ordered sequence of video frames forming a corresponding first video of the object;
    transmitting the video frames to a second terminal,
  at an operator terminal:
    displaying the video frames and allowing an operator of the operator terminal to generate digital graphic components to be superimposed on respective video frames;
    transmitting the digital graphic components to the user terminal,
  wherein the method further comprises:
  at the user terminal:
    receiving from the operator terminal the digital graphic components;
    displaying a second video based on the video frames and based on the received digital graphic components; and
    controlling a display to display the received digital graphic components superimposed on respective video frames, wherein controlling the display comprises:
      during a first phase of a synchronization procedure, displaying the second video by displaying the video frames of the first video,
      during a second phase of the synchronization procedure, following the first phase of the synchronization procedure, displaying the second video by repeating a last video frame that was displayed in the first phase,
      during a third phase of the synchronization procedure, following the second phase of the synchronization procedure, displaying the second video by displaying the received digital graphic components superimposed on the respective video frames, each of the respective video frames having a graphic timestamp equal to a frame timestamp of each video frame, wherein the synchronization procedure comprises a cyclic procedure comprising reiteration of procedure cycles, each procedure cycle corresponding to a selected one among the first phase, the second phase, and the third phase, and
      triggering reiteration of a new procedure cycle every time a first time period corresponding to an inverse of the acquisition frequency is expired.

14. The method of claim 13, further comprising:
  at the user terminal, associating to each video frame a corresponding frame timestamp which specifies a time instant at which the corresponding video frame has been acquired;
  at the operator terminal, associating to each digital graphic component a respective graphic timestamp corresponding to the frame timestamp of the video frame which was displayed on the display and drawing module when the digital graphic component was generated; and
  at the user terminal, displaying the received digital graphic components superimposed on the respective video frames based on the frame timestamp and based on the graphic timestamp.

15. The method of claim 13, wherein a synchronization module is configured to anticipate, with respect to the first time period, the triggering of the reiteration of the new procedure cycle based on measured first time intervals, each one of the measured first time intervals being a time interval measured between transmissions of a digital graphic component by the operator terminal and the reception of the digital graphic component by the user terminal.

16. The method of claim 13, wherein a synchronization module is configured to:
  measure a second time interval between the reception, by the user terminal, of two subsequent graphic components;
  calculate a difference between the second time interval and the first time period; and
  forcing the triggering of the reiteration of the new procedure cycle if an absolute value of the difference is higher than a threshold.

17. The method of claim 16, wherein the threshold is equal to half the first time period.

* * * * *